April 13, 1965   W. R. AIKEN   3,178,702
ADJUSTABLE SIGNALLING DEVICE
Filed March 1, 1961   3 Sheets-Sheet 1

INVENTOR.
BY William Ross Aiken

April 13, 1965   W. R. AIKEN   3,178,702
ADJUSTABLE SIGNALLING DEVICE
Filed March 1, 1961   3 Sheets-Sheet 2

INVENTOR.
William Ross Aiken
BY

April 13, 1965 W. R. AIKEN 3,178,702
ADJUSTABLE SIGNALLING DEVICE
Filed March 1, 1961 3 Sheets-Sheet 3

INVENTOR.
William Ross Aiken
BY

United States Patent Office 3,178,702
Patented Apr. 13, 1965

3,178,702
ADJUSTABLE SIGNALLING DEVICE
William Ross Aiken, 10410 Magdalena Ave.,
Los Altos Hills, Calif.
Filed Mar. 1, 1961, Ser. No. 92,686
3 Claims. (Cl. 340—373)

The present invention relates to signalling devices of the type employing relatively movable components to display, expose or conceal an identifying mark, such as a letter, a figure, a warning symbol or a distinctly painted surface.

It is an object of the invention to provide a signalling device of the type referred to, that is of simple and inexpensive construction and is simple and inexpensive to operate.

Another object of the invention is to provide a signalling device of the type referred to, that is dependable in operation.

These and other objects of the invention will be apparent from the following description of the accompanying drawings which illustrate certain preferred embodiments thereof and wherein.

For actuating a hinged component, such as a plate, for displaying, concealing or exposing a (previously concealed) signalling mark, the invention makes use of the phenomenon employed in solar motors, that a carefully balanced, rotatably mounted sheet having opposite surfaces of different light and/or heat absorptivity, when exposed to a source of radiant energy in an evacuated space begins to spin about its axis of rotation. The theory behind this phenomenon is that the surface which absorbs the great amount of radiant energy repels the residual molecules in the evacuated space with greater force than the surface that absorbs the lesser amount of radiant energy; and in a practically evacuated space the resultant reaction differential is sufficient to cause the sheet to spin as if a force were applied to its surface of higher absorptivity.

Figure 1:
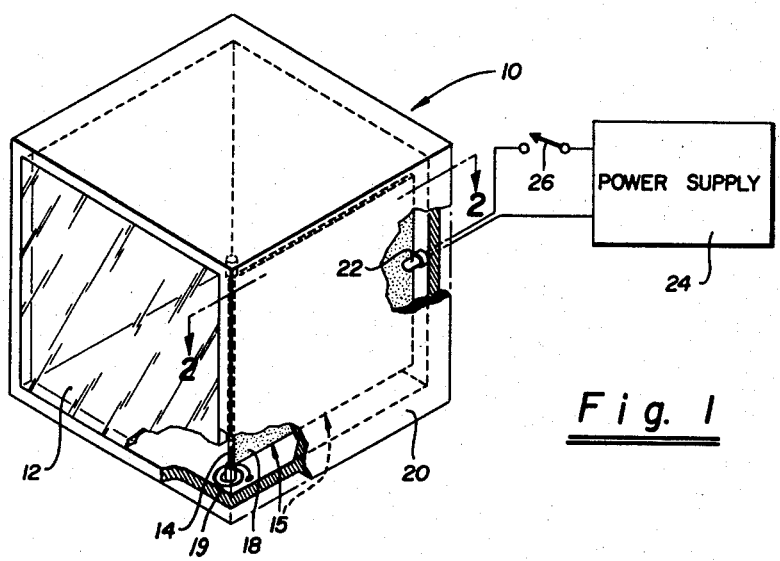
FIGURE 1 is a schematic perspective of an exemplary embodiment of the invention.

Having reference to FIGURE 1, the reference numeral 10 identifies a cube-shaped evacuated cell or enclosure which may be made of a suitable plastic material and its walls are opaque, but it has a transparent front surface or window 12. Supported for rotation about a vertical disposed hinge rod 14 located in a corner of the enclosure adjacent the window 12, is a thin vane 15 which may be made of a sheet of paper or like material, and which has a light front surface 16 and a dark rear surface 18 as shown with exaggerated thickness in FIGURE 2. For instance, the front surface 16 may be painted white and the rear surface 18 may be painted black. The vane 14 may be mechanically biassed such as by the spring means indicated at 19 in FIGURES 1 and 2, to assume ordinarily a position adjacent the side wall 20 of the enclosure. Arranged within the enclosure 19 adjacent the side wall 20 is a source of radiant energy, such as a miniature bulb of high candle-power indicated at 22 in FIGURES 1 and 2, and said lamp is connected to a source of electric power such as a battery, represented by the block 24 through suitable leads including a normally open switch 26. When said switch is closed causing the lamp to light up and illuminate the rear side 18 of the vane or flap 15, the energy differential set up in said flap between the rear and front surfaces thereof causes said flap to spin about the hinge rod 14 into the position illustrated in FIGURE 2, wherein it lies parallel and adjacent to the window 12 and displays its white front surface to the outside. When the lamp 22 is extinguished, however, by opening the switch 26, the flap 15 returns to its initial position adjacent the side wall 20 of the enclosure so that its white front surface is no longer visible and the window 12 presents a dark appearance.

Figure 2:
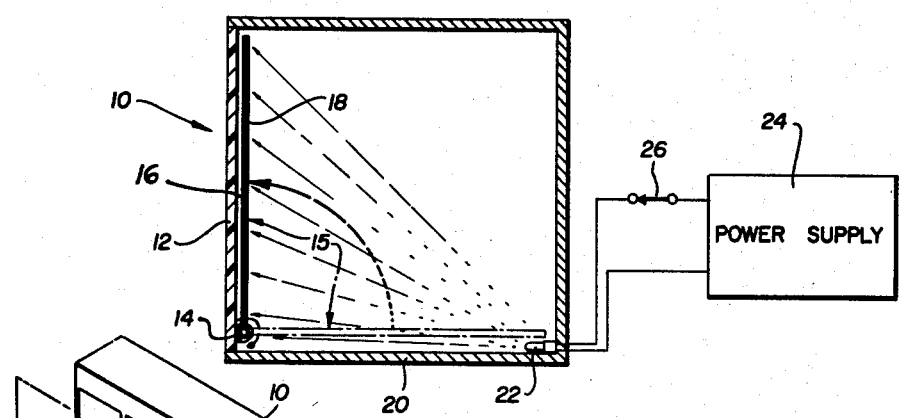
FIGURE 2 is a plan view of the embodiment shown in FIGURE 1, illustrating a different operational position thereof.
Figure 3:
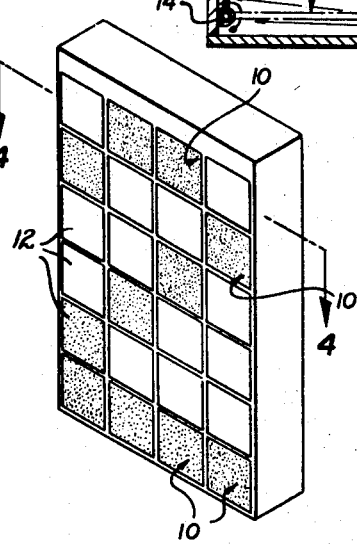
FIGURE 3 is a perspective of an apparatus composed of a plurality of the devices illustrated in FIGURES 1 and 2.
Figure 4:
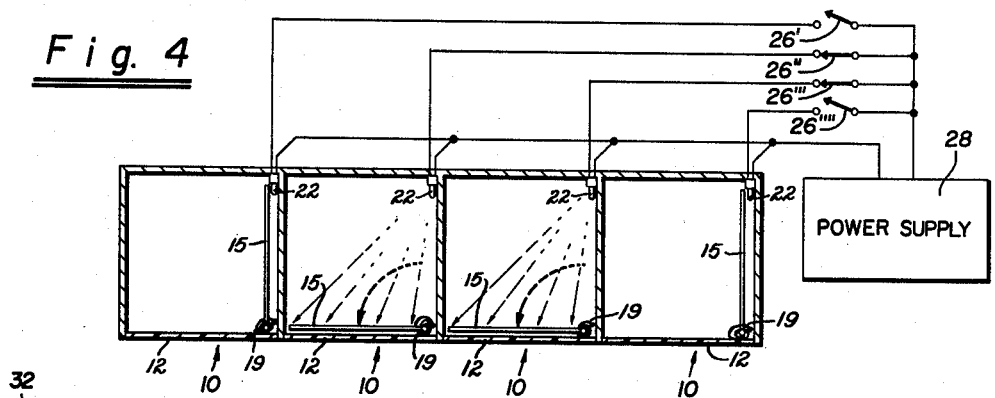
FIGURE 4 is a plan view of the apparatus shown in FIGURE 3 illustrating an electrical control circuit therefor.

FIGURES 3 and 4 illustrate an apparatus that is composed of a plurality of superposed rows of juxtaposed devices of the type illustrated in FIGURES 1 and 2, and any one of the lamps 22 in said devices may selectively be illuminated from a common source of electric power represented by the block 28 by closure of individual switches 26′ to 26′′′′, as illustrated in FIGURE 4. FIGURE 4 shows the uppermost row of signalling devices of the apparatus illustrated in FIGURE 3. It will be understood that any one of the signalling devices in the lower rows of the apparatus may selectively be activated individually from the same source of power 28 by individual switches 26 in arrangements identical to the arrangement illustrated in FIGURE 4. By energizing the lamps of appropriate ones of the signalling devices comprised in the apparatus by closure of the corresponding switches 26, selected ones of the vanes 15 may be swung into positions wherein they lie parallel to the windows 12, and in this manner any character or figure may be represented upon the front surface of the apparatus as illustrated in FIGURE 3 which shows the numeral "2" formed by the displayed front surfaces of the flaps or vanes of activated signalling devices.

Figure 5:
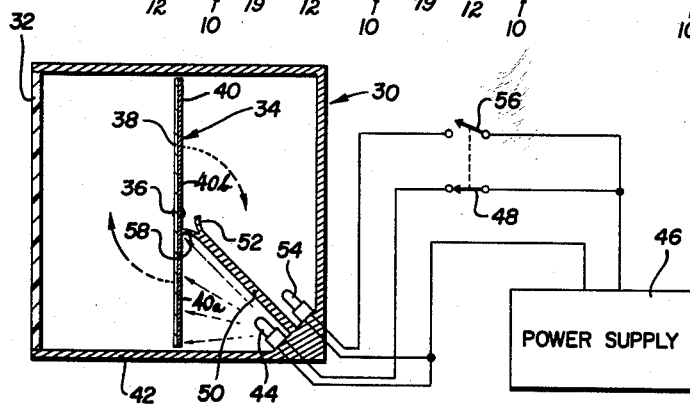
FIGURE 5 is a plan view of a modified embodiment of the invention.

FIGURE 5 illustrates a modified embodiment of the invention which comprises a cube-shaped enclosure 30 made of opaque material and having a transparent front wall or window 32 as the embodiment of the invention illustrated in FIGURES 1 and 2. In the device illustrated in FIGURE 5, however, the vane or flap 34 is mounted for rotation about a centrally located hinge rod 36. The front surface of said vane is provided with a white coat while its rear surface carries a black coat as indicated with exaggerated thickness at 38 and 40, respectively. Located in the rear corner of the enclosure 30 adjacent the side wall 42 thereof is a lamp 44 which may be energized from a source of power 46 by closure of a normally open switch 48. When the lamp 44 lights up, it illuminates the rear surface of the near half 40a of the vane 34, and said vane turns about the axis 36 in a clockwise direction as viewed in FIGURES 5 and 6 from the position illustrated in FIGURE 5 wherein it presents its white front surface to the window 32 into the position illustrated in FIGURE 6 which is determined by an appropriately located limit stop and wherein it presents a side edge to the window and its white front surface can no longer be seen from the outside. To avoid that light from the illuminated lamp 44 may exert a rotation-opposing effect upon the opposite half 40b of the vane as the rear surface of said opposite half approaches and presents itself fully to the illuminated lamp 44 during the described operation of the device, a diagonally extending screen 50 is preferably arranged adjacent the lamp 44 on the side thereof removed from the adjacent half 40a of the vane in its initial position, as shown in both FIGURES 5 and 6, and this screen shields the opposite half 40b of the vane from the light of said lamp 44 as the vane is turned into its "invisible" position at right angles to the plane of the window 32. The centrally located edge of said screen 50 may be turned out of its plane to form an ear 52 that acts as the hereinbefore mentioned limit stop which positively arrests rotation of the vane in exactly its "invisible" position.

To return the vane from its "invisible" position to its initial position after the lamp 44 has been extinguished, a second lamp 54 (FIGURES 5 and 7) may be arranged adjacent the other side of the screen 50 and may be energized from the same source of power 46 by closure of another normally open switch 56. When the lamp 54 is illuminated while the lamp 44 on the opposite side of the screen 50 is extinguished, an opposite moment is imparted to the vane 34 causing it to turn in a counter-clockwise direction as viewed in FIGURES 5 and 6 until it comes against another limit stop that may be formed by another ear 58 provided on the center edge of the screen 50 and which arrests the vane in exactly its initial position wherein it presents its white front surface 38 through the window 32 to the outside.

Figure 6:
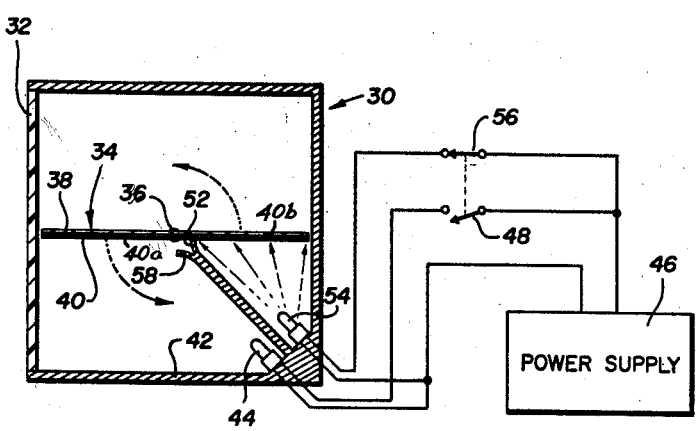
FIGURE 6 is a plan view of the same embodiment in a different operational position.

The embodiment of the invention illustrated in FIGURES 5 and 6 has the advantage that rotation of its signalling vane under the influence of light is not impeded by any illumination to which it may be subjected from the outside through a window 38 because any such illumination would equally affect the opposite halves of the front surface of the vane on either side of the axis of rotation thereof. Hence, any rotational moments imparted to the vane by such outside illumination would cancel each other out.

It will be understood that devices of the type illustrated in FIGURES 5 and 6 may be assembled into composite signaling apparatus of the kind illustrated in FIGURES 3 and 4 without departing from the scope and spirit of my invention.

Figure 7:
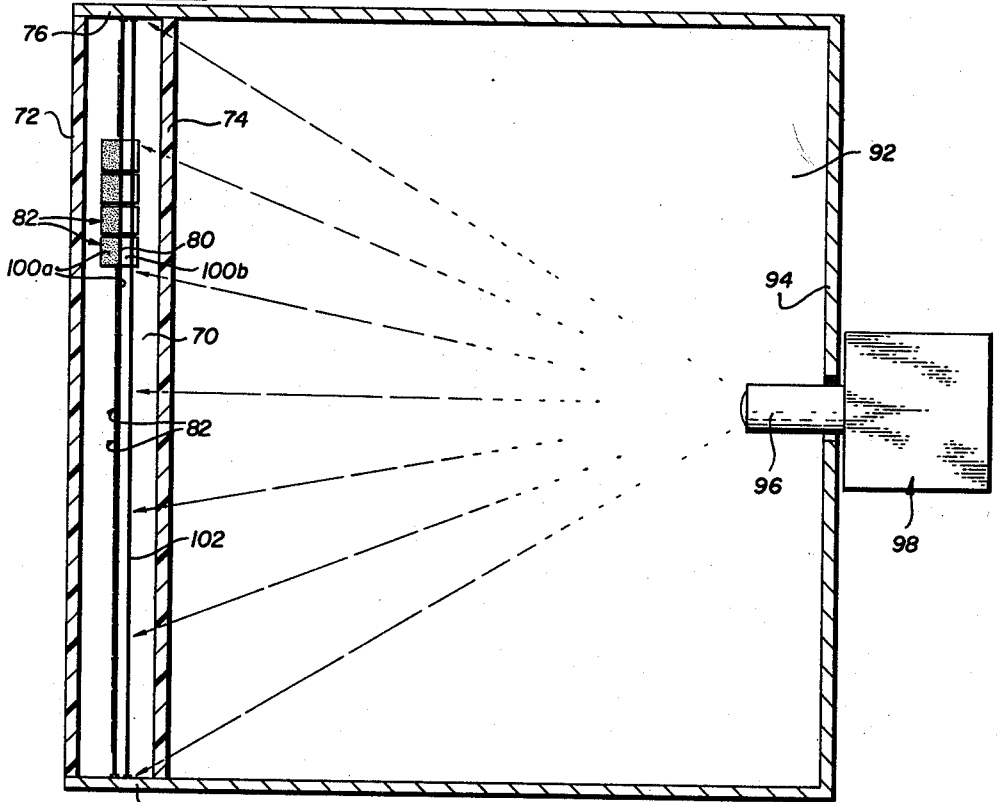
FIGURE 7 is a schematic side elevation of a signalling apparatus employing a multitude of devices of the type illustrated in FIGURES 5 and 6.

FIGURE 7 illustrates an apparatus wherein an array of juxta- and superposed devices similar to the components shown at 34 in FIGURES 5 and 6, are employed to form a screen upon whose frontal surface any letter, sign or symbol may be formed by projecting an image thereof on the rear surface of the screen. In said figure the reference numeral 70 indicates an evacuated air-tight chamber having a transparent front wall or window 72. Strung between the top wall 76 and the bottom wall 70 of said chamber at equi-spaced intervals are many vertically-disposed wires 80, and hingedly supported upon each wire for rotation thereabout are many superposed flaps or vanes 82 similar to the flaps or vanes 34 illustrated in FIGURES 5 and 6, the arrangement being such that the flaps 82 form many superposed parallel rows 84. Ordinarily, all the vanes are yieldably held in a position wherein they present their frontal surfaces 86 through the window 72 to the outside. This may be accomplished by weak springs indicated at 88, one associated with each flap 82, which urge the flaps in a counter-clockwise direction as viewed in FIGURE 9, until their right edges bear against suitable limit stops. In the exemplary embodiment of the invention illustrated in FIGURES 7, 8 and 9 these stops are formed by wires 90 that are strung between the top and bottom walls of the chamber adjacent the hereinbefore described hinge wires 80.

The evacuated chamber 70 constitutes the front end of another large chamber or enclosure 92 of opaque material, and through the rear wall 94 of said chamber at a central point thereof extends the lens portion 96 of a projector 98.

Figure 8:
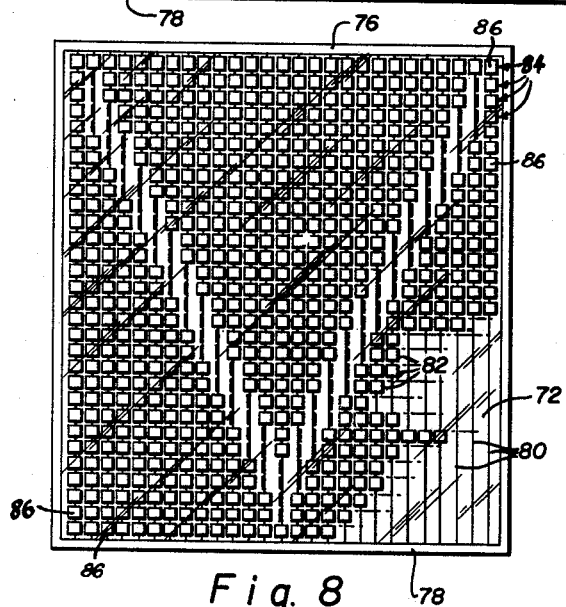
FIGURE 8 is a front elevation of the apparatus shown in FIGURE 7.
Figure 9:
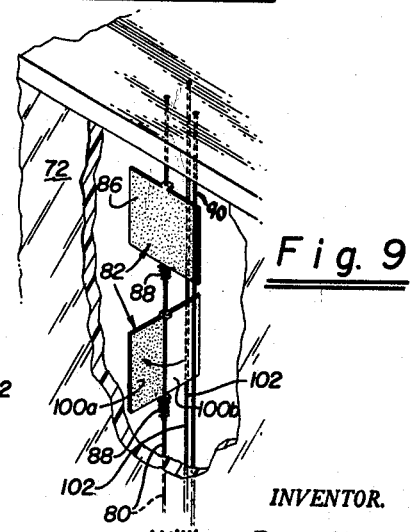
FIGURE 9 is an enlarged perspective showing a detail of the apparatus illustrated in FIGURES 7 and 8.

The front surfaces of the vanes 82 on the wires 80 may all be painted in a dark color, such as black, over the total areas thereof, as indicated at 86 in FIGURES 8 and 9. The rear surfaces 100 of said vanes, however, are divided into symmetrical halves along their axis of rotation, and one of said halves, say the left half as viewed from the rear of chamber 92, is painted black as shown at 100a in FIGURE 9, while the right half is painted white as shown at 100b in said FIGURE 9.

When a bright image is thrown by the projector 98 through the transparent rear wall 74 of the evacuated chamber 70 onto the rear surfaces 100 of the vanes 82, those of the vanes that remain in darkness will not change their position. Those which receive light, however, will turn in a clockwise direction as viewed in FIGURE 9 and present their edges to the window 72 so that they are practically invisible from the outside. Appropriately placed vertically extending stop wires 102 may be strung between the top and bottom walls of the chamber 70 to arrest rotation of the vanes in response to illumination from projector 98 at exactly this position. In this manner an image identical to the image produced by the projector will appear at the front of chamber 70 as illustrated in FIGURE 9 which shows a V formed on the front wall of the apparatus. This image does not depend upon the light of the projector for distinct visibility from the outside but is clearly defined by the contours of the dark environment established by the black front surfaces 86 of the vanes that remained in their original position. It is therefore clearly visible from the outside even in reflected sunlight in contradistinction to signs that are made visible by internal illumination. The latter type of sign is frequently difficult to discern when viewed against reflected sunlight. In fact, the image produced in accordance with the invention is clearly visible from a point in front of chamber 70, even if invisible infra-red light is used in the projector 96 to project the image upon the rear surfaces of the vanes; and any light thrown upon the vanes from the outside through the window 72 of chamber 70, remains without effect upon the performance of the apparatus because the front surfaces of the vanes are of a uniform light and heat absorptivity and therefore, any forces exerted upon the opposite halves of the vanes by light from the outside, cancel each other out.

I claim:

1. A signalling device comprising an evacuated chamber having opaque walls and a window, a vane having opposite surfaces of different absorptivity of heat or light radiation, means mounting said vane for rotary movement between a position wherein it covers said window and a position wherein it uncovers said window, a source of heat or light radiation located to direct said radiation on the high absorptivity side of said vane, and means operable to energize said source of radiation.

2. A signalling device comprising an evacuated chamber having a transparent front wall, a vane having a surface of uniform absorptivity of heat or light radiation and an opposite surface divided into halves of different absorptivity of heat or light radiation along the center axis thereof, the radiation absorptivity of one of said halves being different from the radiation absorptivity of said first mentioned surface, means mounting said vane for rotation about said center axis thereof from a position wherein it presents said first mentioned surface to said transparent front wall to a position wherein it extends substantially at right angles to said front wall, and a source of heat or light radiation arranged on the side of said vane opposite to said front wall.

3. A signalling device comprising an evacuated chamber having opaque walls and a window, a vane having a surface absorptive of heat or light radiation, means mounting said vane within said chamber for rotation between a position wherein it covers said window and a position wherein it uncovers said window, a source of heat or light radiation located to direct said radiation on the side of said radiation absorptive surface, and means operable to energize said source of radiation.

References Cited by the Examiner
UNITED STATES PATENTS

| 182,172 | 9/76 | Crookes | 88—23 |
| 454,719 | 6/91 | Deshler | 88—23 |
| 1,000,831 | 8/11 | Martin | 88—23 |
| 2,770,061 | 11/56 | Marcy | 340—378 |
| 2,912,674 | 11/59 | Aiken | 340—44 |
| 2,952,835 | 9/60 | Aiken | 340—107 X |

NEIL C. READ, *Primary Examiner.*

RUDOLPH V. ROLINEC, *Examiner.*